(12) United States Patent
Knight et al.

(10) Patent No.: US 6,436,534 B1
(45) Date of Patent: *Aug. 20, 2002

(54) ELASTIC FIBERS, FABRICS AND ARTICLES FABRICATED THEREFROM

(75) Inventors: George W. Knight; Edward N. Knickerbocker; Rexford A. Maugans, all of Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/906,440

(22) Filed: Jul. 16, 2001

Related U.S. Application Data

(60) Division of application No. 08/688,416, filed on Jul. 30, 1996, which is a continuation of application No. 08/451,870, filed on May 26, 1995, now abandoned, which is a division of application No. 08/339,610, filed on Nov. 15, 1994, now abandoned, which is a continuation of application No. 08/053,583, filed on Apr. 27, 1993, now abandoned, which is a continuation-in-part of application No. 07/939,281, filed on Sep. 2, 1992, now Pat. No. 5,278,272, and a continuation-in-part of application No. 07/776,130, filed on Oct. 15, 1991, now Pat. No. 5,272,236.

(51) Int. Cl.[7] .................................................. D02G 3/32
(52) U.S. Cl. ....................... 428/365; 428/364; 428/373; 428/374; 428/500; 428/516; 526/348; 525/240
(58) Field of Search .......................... 526/348; 428/364, 428/365, 373, 374, 500, 516; 525/240

(56) References Cited

U.S. PATENT DOCUMENTS

| | | |
|---|---|---|
| 2,957,512 A | 10/1960 | Wade et al. |
| 3,485,706 A | 12/1969 | Evans |
| 3,542,903 A * | 11/1970 | Congiundi et al. ......... 525/440 |
| 3,645,992 A | 2/1972 | Elston |
| 3,678,134 A | 7/1972 | Middlebrook |
| 3,949,128 A | 4/1976 | Ostermeier |
| 4,076,698 A | 2/1978 | Anderson et al. |
| 4,181,762 A | 1/1980 | Benedyk |
| 4,197,377 A | 4/1980 | Bohm et al. |
| 4,209,563 A | 6/1980 | Sisson |
| 4,250,273 A | 2/1981 | Bohm et al. |
| 4,281,689 A | 8/1981 | Benedyk |
| 4,296,163 A | 10/1981 | Emi et al. |
| 4,322,027 A | 3/1982 | Reba |
| 4,323,534 A | 4/1982 | DesMarais |
| 4,340,563 A | 7/1982 | Appel et al. |
| 4,381,781 A | 5/1983 | Sciaraffa et al. |
| 4,413,110 A | 11/1983 | Kavesh et al. |
| 4,425,393 A | 1/1984 | Benedyk et al. |
| 4,426,420 A | 1/1984 | Likhyani |
| 4,450,026 A | 5/1984 | Pieniak et al. |
| 4,477,516 A | 10/1984 | Sugihara et al. |
| 4,486,552 A | 12/1984 | Niemann |
| 4,543,099 A | 9/1985 | Bunnelle et al. |
| 4,578,414 A | 3/1986 | Sawyer et al. |
| 4,584,347 A | 4/1986 | Harpell et al. |
| 4,644,045 A | 2/1987 | Fowells |
| 4,652,487 A | 3/1987 | Morman |
| 4,655,760 A | 4/1987 | Morman et al. |
| 4,657,802 A | 4/1987 | Morman |
| 4,663,220 A | 5/1987 | Wisneski et al. |
| 4,663,221 A | 5/1987 | Makimura et al. |
| 4,668,566 A | 5/1987 | Braun |
| 4,707,398 A | 11/1987 | Boggs |
| 4,719,261 A | 1/1988 | Bunnelle et al. |
| 4,720,415 A | 1/1988 | Vander Wielen et al. |
| 4,724,184 A | 2/1988 | Killian et al. |
| 4,734,311 A | 3/1988 | Sokolowski |
| 4,741,949 A | 5/1988 | Morman et al. |
| 4,775,579 A | 10/1988 | Hagy et al. |
| 4,777,080 A | 10/1988 | Harris, Jr. et al. |
| 4,781,966 A | 11/1988 | Taylor |
| 4,789,699 A | 12/1988 | Kieffer et al. |
| 4,801,482 A | 1/1989 | Goggans et al. |
| 4,803,117 A | 2/1989 | Daponte |
| 4,804,577 A | 2/1989 | Hazelton et al. |
| 4,818,597 A | 4/1989 | DaPonte et al. |
| 4,820,572 A | 4/1989 | Killian et al. |
| 4,830,907 A | 5/1989 | Sawyer et al. |
| 4,833,012 A | 5/1989 | Makimura et al. |
| 4,835,194 A | 5/1989 | Bright et al. |
| 4,842,922 A | 6/1989 | Krupp et al. |
| 4,857,251 A | 8/1989 | Nohr et al. |
| 4,861,652 A | 8/1989 | Lippert et al. |
| 4,863,779 A | 9/1989 | Daponte |
| 4,874,447 A | 10/1989 | Hazelton et al. |
| 4,879,170 A | 11/1989 | Radwanski et al. |
| 4,883,549 A | 11/1989 | Frost et al. |
| 4,891,957 A | 1/1990 | Strack et al. |
| 4,908,412 A | 3/1990 | Otawa et al. |
| 4,909,975 A | 3/1990 | Sawyer et al. |
| 4,923,742 A | 5/1990 | Killian et al. |
| 4,935,287 A | 6/1990 | Johnson et al. |
| 4,938,753 A | 7/1990 | Van Gompel et al. |
| 4,938,757 A | 7/1990 | Van Gompel et al. |

(List continued on next page.)

FOREIGN PATENT DOCUMENTS

| | | | |
|---|---|---|---|
| CA | 2085073 | 6/1993 | |
| EP | 0 546 837 A1 | 6/1993 | |
| WO | 93/06168 | 4/1993 | |
| WO | 93/08221 | 4/1993 | |
| WO | WO 93/21242 A1 | 10/1993 | ......... C08F/210/16 |

OTHER PUBLICATIONS

US 5,168,111, 12/1992, Canich (withdrawn)

*Primary Examiner*—Fred Teskin

(57) ABSTRACT

Elastic fibers and fabrics made from homogeneously branched substantially linear ethylene polymers are disclosed which can be produced on conventional polypropylene or polyethylene fiber or fabric processes. They can be used to produce highly elastic structures that can have recycle compatibility between elastic and non-elastic components. The novel fibers have at least about 50% recovery at 100% strain. The fibers and fabrics are especially useful in making fabricated articles and components thereof (e.g., disposable diapers).

8 Claims, 2 Drawing Sheets

U.S. PATENT DOCUMENTS

| | | |
|---|---|---|
| 4,939,016 A | 7/1990 | Radwanski et al. |
| 4,940,464 A | 7/1990 | Van Gompel et al. |
| 4,965,122 A | 10/1990 | Morman |
| 4,981,747 A | 1/1991 | Morman |
| 4,981,749 A | 1/1991 | Kubo et al. |
| 4,990,204 A | 2/1991 | Krupp et al. |
| 5,026,798 A | 6/1991 | Canich ..................... 526/127 |
| 5,035,240 A | 7/1991 | Braun et al. |
| 5,036,551 A | 8/1991 | Dailey et al. |
| 5,037,416 A | 8/1991 | Allen et al. |
| 5,055,438 A | 10/1991 | Canich ..................... 502/117 |
| 5,068,141 A | 11/1991 | Kubo et al. |
| 5,096,867 A | 3/1992 | Canich ..................... 502/103 |
| 5,110,870 A | 5/1992 | Fujii et al. |
| 5,112,686 A | 5/1992 | Krupp et al. |
| 5,116,662 A | 5/1992 | Morman |
| 5,169,706 A | 12/1992 | Collier, IV et al. |
| 5,196,000 A | 3/1993 | Clear et al. |
| 5,264,405 A | 11/1993 | Canich ..................... 502/103 |
| 5,272,236 A | 12/1993 | Lai et al. |
| 5,278,272 A | 1/1994 | Lai et al. |
| 5,322,728 A * | 6/1994 | Davey et al. ............... 428/296 |
| 5,324,576 A | 6/1994 | Reed et al. |
| 6,140,442 A * | 10/2000 | Knight et al. ........ 526/348.3 X |

* cited by examiner

OPEN BOXES: HOMOGENEOUSLY BRANCHED SUBSTANTIALLY LINEAR
   LOW DENSITY POLYETHYLENE, DENSITY: >0.91
SOLID BOXES: HETEROGENEOUSLY BRANCHED LLDPE

ELASTIC FIBERS, FABRICS AND ARTICLES FABRICATED THEREFROM

CROSS-REFERENCE TO RELATED APPLICATIONS

This application is a Divisional of U.S. application Ser. No. 08/688,416, filed Jul. 30, 1996 which is a Continuation of U.S. application Ser. No. 08/451,870, filed May 26, 1995 (abandoned), which was a Divisional of U.S. application Ser. No. 08/339,610 filed Nov. 15, 1994 (abandoned) which was a Continuation of U.S. application Ser. No. 08/053,583, filed Apr. 27, 1993 (abandoned) which was a Continuation-in-Part of U.S. application Ser. No. 07/776,130, filed Oct. 15,1991 (now U.S. Pat. No. 5,272,236) and a Continuation-in-Part of U.S. application Ser. No. 07/939,281, filed Sep. 2, 1992, (now U.S. Pat. No. 5,278,272), the disclosures of all of which are incorporated herein by reference.

FIELD OF THE INVENTION

This invention relates to elastic fibers, fabrics and articles fabricated therefrom (e.g., disposable incontinence garments or diapers). The fibers and fabrics comprise at least one homogeneously branched substantially linear ethylene polymer having specific properties.

BACKGROUND OF THE INVENTION

Fiber is typically classified according to its diameter. Monofilament fiber is generally defined as having an individual fiber diameter greater than about 15 denier, usually greater than about 30 denier per filament. Fine denier fiber generally refers to a fiber having a diameter less than about 15 denier per filament Microdenier fiber is generally defined as fiber having less than 100 microns diameter. The fiber can also be classified by the process by which it is made, such as monofilament, continuous wound fine filament, staple or short cut fiber, spun bond, and melt blown fiber.

A variety of fibers and fabrics have been made from thermoplastics, such as polypropylene, highly branched low density polyethylene (LDPE) made typically in a high pressure polymerization process, linear heterogeneously branched polyethylene (e.g., linear low density polyethylene made using Ziegler catalysis), blends of polypropylene and linear heterogeneously branched polyethylene, blends of linear heterogeneously branched polyethylene, and ethylene/vinyl alcohol copolymers.

Of the various polymers known to be extrudable into fiber, highly branched LDPE has not been successfully melt spun into fine denier fiber. Linear heterogeneously branched polyethylene has been made into monofilament, as described in U.S. Pat. No. 4,076,698 (Anderson et al.), the disclosure of which is incorporated herein by reference. Linear heterogeneously branched polyethylene has also been successfully made into fine denier fiber, as disclosed in U.S. Pat. No. 4,644,045 (Fowells), U.S. Pat. No. 4,830,907 (Sawyer et al.), U.S. Pat. No. 4,909,975 (Sawyer et al.) and in U.S. Pat. No. 4,578,414 (Sawyer et al.), the disclosures of which are incorporated herein by reference. Blends of such heterogeneously branched polyethylene have also been successfully made into fine denier fiber and fabrics, as disclosed in U.S. Pat. No. 4,2,922 (Krupp et al.), U.S. Pat. No. 4,990,204 (Krupp et al.) and U.S. Pat. No. 5,112,686 (Krupp et al.), the disclosures of which are all incorporated herein by reference. U.S. Pat. No. 5,068,141 (Kubo et al.) also discloses making nonwoven fabrics from continuous heat bonded filaments of certain heterogeneously branched LLDPE having specified heats of fusion.

However, fibers made from all of these types of saturated olefinic polymers are not "elastic", as that term is defined below, without incorporating additives or elastomers, thus limiting their use in elastic applications. One attempt to alleviate this problem by incorporating additives into the polymer prior to melt spinning is disclosed in U.S. Pat. No. 4,663,220 (Wisneski et al.), the disclosure of which is incorporated herein by reference. Wisneski et al. disclose fibrous elastomeric webs comprising at least about 10 percent of a block copolymer and a polyolefin. The resultant webs are said to have elastomeric properties.

U.S. Pat. No. 4,425,393 (Benedyk) discloses monofilament fiber made from polymeric material having an elastic modulus from 2,000 to 10,000 psi. The polymeric material includes plasticized polyvinyl chloride (PVC), low density polyethylene (LDPE), thermoplastic rubber, ethylene-ethyl acrylate, ethylene-butylene copolymer, polybutylene and copolymers thereof, ethylene-propylene copolymers, chlorinated polypropylene, chlorinated polybutylene or mixtures of those.

Elastic fiber and web prepared from a blend of at least one elastomer (i.e., copolymers of an isoolefin and a conjugated polyolefin (e.g., copolymers of isobutylene and isoprene)) and at least one thermoplastic is disclosed in U.S. Pat. No. 4,874,447 (Hazelton et al.), the disclosure of which is incorporated herein by reference.

U.S. Pat. No. 4,657,802 (Morman), the disclosure of which is incorporated herein by reference, discloses composite nonwoven elastic webs and a process for their manufacture. The elastic materials useful for forming the fibrous nonwoven elastic web include polyester elastomneric materials, polyurethane elastomeric materials, and polyamide elastomeric materials.

U.S. Pat. No. 4,833,012 (Makimura et al.), the disclosure of which is incorporated herein by reference, discloses nonwoven entanglement fabrics made from a three dimensional entanglement of elastic fibers, nonshrinkable nonelastic fibers, and shrinkable elastic fibers. The elastic fibers are made from polymer diols, polyurethanes, polyester elastomers, polyamide elastomers and synthetic rubbers.

Composite elastomeric polyether block amide nonwoven webs are disclosed in U.S. Pat. No. 4,820,572 (Killian et al.),, the disclosure of which is incorporated herein by reference. The webs are made using a melt blown process and the elastic fibers are made from a polyether block amide copolymer.

Another elastomeric fibrous web is disclosed in U.S. Pat. No. 4,803,117 (Daponte). Daponte discloses that the webs are made from elastomeric fibers or microfibers made from copolymers of ethylene and at least one vinyl monomer selected from the group including vinyl ester monomers, unsaturated aliphatic monocarboxylic acids and alkyl esters of these monocarboxylic acids. The amount of the vinyl monomer is said to be "sufficient" to impart elasticity to the melt-blown fibers. Blends of the ethylene/vinyl copolymers with other polymers (e.g., polypropylene or linear low density polyethylene) are also said to form the fibrous webs.

Fabricated articles, such as incontinence garments, also benefit from use of elastic components. For example, U.S. Pat. No. 4,940,464 (Van Gompel et at.), U.S. Pat. No. 4,938,757 (Van Gompel et al.), and U.S. Pat. No. 4,938,753 (Van Gompel et al.), the disclosures of which are incorporated herein by reference, discloses disposable garments containing elastic gathering means and stretchable side panels. The gathering means and stretchable side panels are made from melt blown or film of block or graft copolymers (e.g., butadiene, isoprene, styrene, ethylene-methyl acrylate, ethylene-vinyl acetate, ethylene-ethyl acrylate or blends thereof.

While previous efforts to make elastic fibers and fabrics from olefinic polymers have focused on polymer additives, these solutions have potential detriments, including the increased cost of the additives, and incompatibility, resulting in substandard spinning performance.

SUMMARY OF THE INVENTION

We have discovered new elastic fiber and fabrics which do not need additives to be elastic. These new fiber and fabrics can be produced on conventional synthetic fiber or fabric processes (e.g., continuous wound filament, spun bond, and melt blown) and they can be used to produce highly elastic structures that can have recycle compatibility between elastic and non-elastic components. These fibers and fabrics are made from novel elastic homogeneously branched substantially linear ethylene polymers. These homogeneously branched substantially linear ethylene polymers have a processability in fiber and fabric processes similar to heterogeneously branched linear low density polyethylene, which means that the new elastic fiber and fabrics can be produced on conventional equipment.

The new elastic fiber has a permanent set of about 50% or less, or, stated another way, a percent recovery of at least about 50%. This property is surprisingly different than the response of fibers made from heterogeneously branched linear low density polyethylene where the percent permanent set seems to be generally greater than 50% and substantially independent of density, as illustrated in FIG. 2. The new elastic fiber is made from at least one homogeneously branched substantially linear ethylene polymer having:

a) a melt flow ratio, $I_{10}/I_2, \geq 5.63$, b) a molecular weight distribution, $M_w/M_n$, defined by the equation:

$$M_w/M_n \leq (I_{10}/I_2) - 4.63,$$

c) a critical shear rate at onset of surface melt fracture of at least 50 percent greater than the critical shear rate at the onset of surface melt fracture of a linear ethylene polymer having about the same $I_2$ and $M_w/M_n$, and d) a density less than about 0.90 g/cm$^3$.

DETAILED DESCRIPTION OF THE INVENTION

Figure 1:
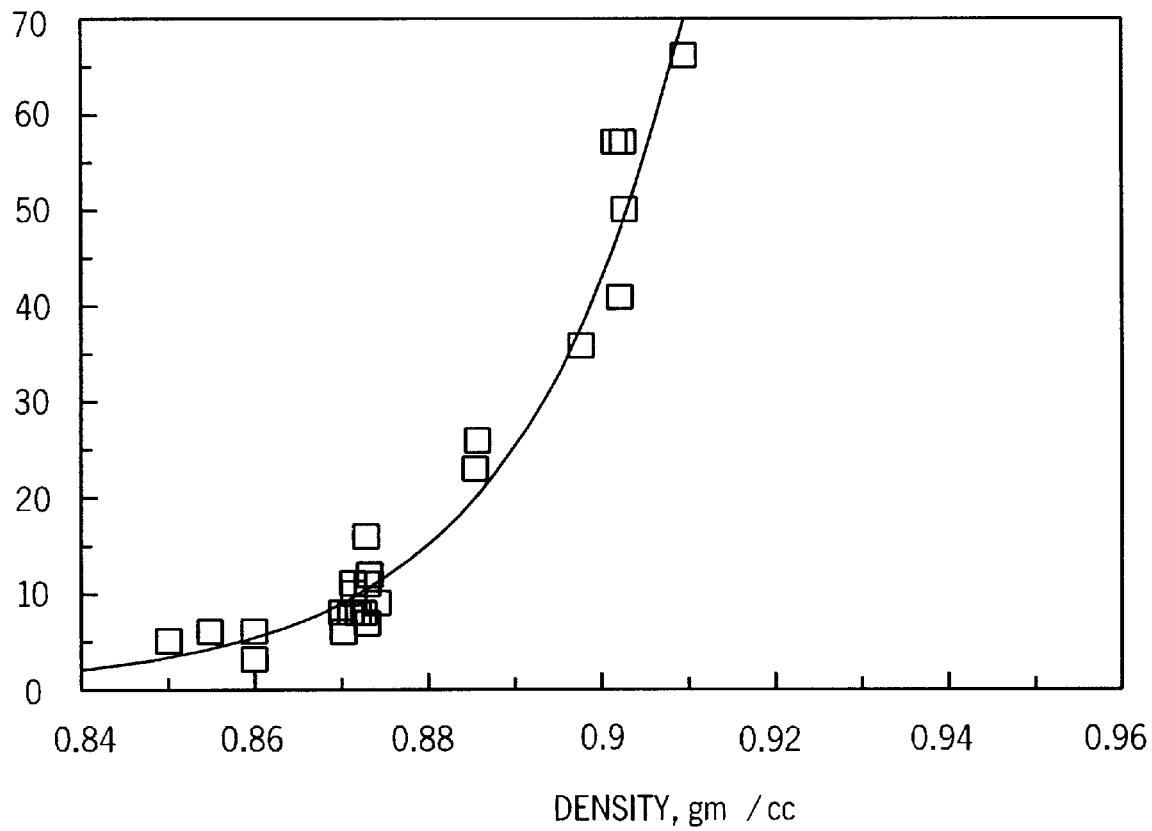
FIG. 1 graphically displays percent permanent set for fibers made from elastic substantially linear ethylene polymers of the present invention versus the density of the polymer.

The homogeneously branched substantially linear ethylene polymers used to make the fibers and fabrics of the present invention can be interpolymers of ethylene with at least one $C_3$–$C_{20}$ α-olefin. The term "interpolymer" used herein-indicates that the polymer can be a copolymer, a terpolymer, and the like. Monomers usefully copolymerized to make the homogeneously branched substantially linear ethylene polymers include the $C_3$–$C_{20}$ α-olefins especially 1-pentene, 1-hexene, 4-methyl-1-pentene, and 1-octene. Especially preferred comonomers include 1-pentene, 1-hexene and 1-octene. Copolymers of ethylene and a $C_3$–$C_{20}$ α-olefin are especially preferred.

The substantially linear ethylene polymers used to make the fibers and fabrics of the present invention can also be ethylene homopolymers.

The term "substantially linear" means that the polymer backbone is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

Long chain branching is defined herein as a chain length of at least about 6 carbons, above which the length cannot be distinguished using $^{13}$C nuclear magnetic resonance spectroscopy. The long chain branch can be as long as about the same length as the length of the polymer back-bone.

Long chain branching is determined by using $^{13}$C nuclear magnetic resonance (NMR) spectroscopy and is quantified using the method of Randall (*Rev. Macromol.Chem. Phys.* C29 (2&3), p. 285–297), the disclosure of which is incorporated herein by reference.

The homogeneously branched substantially linear ethylene polymers are characterized as having:

a) a melt flow ratio, $I_{10}/I_2, \geq 5.63$, b) a molecular weight distribution, $M_w/M_n$, defined by the equation:

$$M_w/M_n \leq (I_{10}/I_2) - 4.63,$$

and c) a critical shear stress at onset of gross melt fracture greater than $4 \times 10^6$ dyne/cm$^2$.

The homogeneously branched substantially linear ethylene polymers can also be characterized as having:

a) a melt flow ratio, $I_{10}/I_2, \geq 5.63$, b) a molecular weight distribution, $M_w/M_n$, defined by the equation:

$$M_w/M_n \leq (I_{10}/I_2) - 4.63,$$

and c) a critical shear rate at onset of surface melt fracture at least 50 percent greater than the critical shear rate at the onset of surface melt fracture of either a homogeneously or heterogeneously branched linear ethylene polymer having about the same $I_2$ and $M_w/M_n$.

The novel homogeneously branched substantially linear ethylene polymers used to make the elastic fibers are easily distinguished from homogeneously branched linear ethylene polymers. The term "homogeneously branched linear ethylene polymer" means that the polymer does not have long chain branching. That is, the linear ethylene polymer has an absence of long chain branching, as for example the traditional heterogeneously branched linear low density polyethylene polymers or linear high density polyethylene polymers made using Ziegler polymerization processes (e.g., U.S. Pat. No. 4,076,698 (Anderson et al.) the disclosure of which is incorporated herein by reference) or linear homogeneously branched polymers (e.g., U.S. Pat. No. 3,645,992 (Elston) the disclosure of which is incorporated herein by reference). The term "linear ethylene polymers" does not refer to high pressure branched polyethylene, ethylene/vinyl acetate copolymers, or ethylene/vinyl alcohol copolymers which are known to those skilled in the art to have numerous long chain branches.

The homogeneously branched substantially linear ethylene polymers used to form the elastic fibers have homogeneous branching distributions. The terms "homogeneously branching distribution" and "homogeneously branched" means that the comonomer is randomly distributed within a given molecule and that substantially all of the copolymer molecules have the same ethylene/comonomer ratio. The homogeneity of the branching distribution can be measured variously, including measuring the SCBDI (Short Chain Branch Distribution Index) or CDBI (Composition Distribution Branch Index). SCBDI or CDBI is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.* Vol. 20, p. 441 (1982), or in U.S. Pat. No. 4,798,081, both disclosures of which are incorporated herein by reference. The SCBDI or CDBI for the homogeneously branched substantially linear ethylene polymers used in the present invention is preferably greater than about 30 percent, especially greater than about 50 percent.

The homogeneously branched substantially linear ethylene polymers used to make the elastic fibers of the present invention have a single melting peak, as measured using differential scanning calorimetry (DSC), in contrast to heterogeneously branched linear ethylene polymers, which have 2 or more melting peaks, due to the heterogeneously branched polymer's broad branching distribution.

A unique characteristic of the homogeneously branched substantially linear ethylene polymers used to form the elastic fibers and fabrics is a highly unexpected flow property where the $I_{10}/I_2$ value of the polymer is essentially independent of polydispersity index (i.e. ($M_w/M_n$) of the polymer. This is contrasted with conventional linear homogeneously branched and linear heterogeneously branched polyethylene resins having rheological properties such that to increase the $I_{10}/I_2$ value, the polydispersity index must also be increased. The novel homogeneously branched substantially linear ethylene polymers also exhibit good processability and low pressure drop through a spinneret pack, even when using high shear filtration.

The density of the homogeneously branched substantially linear ethylene polymers used to make the elastic fibers of the present invention is measured in accordance with ASTM D-792 and is generally less than about 0.90 g/cm$^3$, preferably from about 0.85 g/cm$^3$ to about 0.90 g/cm$^3$, more preferably from about 0.85 g/cm$^3$ to about 0.89 g/cm$^3$, and especially from about 0.85 g/cm$^3$ to about 0.88 g/cm$^3$.

The molecular weight of the homogeneously branched substantially linear ethylene polymers used to make the elastic fibers of the present invention is conveniently indicated using a melt index measurement according to ASTM D-1238, Condition 190° C./2.16 kg (formally known as "Condition (E)" and also known as $I_2$). Melt index is inversely proportional to the molecular weight of the polymer. Thus, the higher the molecular weight, the lower the melt index, although the relationship is not linear. The melt index for the homogeneously branched substantially linear ethylene polymers used to make the elastic fibers used herein is generally from about 0.01 grams/10 minutes (g/10 min) to about 1000 g/10 min, preferably from about 0.1 g/10 min to about 5 g/10 min for monofilament (fibers generally above about 15 denier/filament), and preferably from about 5 g/10 min to about 250 g/10 min for fine denier fibers (fibers having a diameter generally less than or equal to 15 denier/filament).

Another measurement useful in characterizing the molecular weight of the homogeneously branched substantially linear ethylene polymers used to make the elastic fibers is conveniently indicated using a melt index measurement according to ASTM D-1238, Condition 190° C./10 kg (formerly known as "Condition (N)" and also known as $I_{10}$) The ratio of these two melt index terms is the melt flow ratio and is designated as $I_{10}/I_2$. For the homogeneously branched substantially linear ethylene polymers of the invention, the $I_{10}/I_2$ ratio indicates the degree of long chain branching, i.e., the higher the $I_{10}/I_2$ ratio, the more long chain branching in the polymer. Generally, the $I_{10}/I_2$ ratio of the homogeneously branched substantially linear ethylene polymers is at least about 5.63, preferably at least about 6, more preferably at least about 7, and especially at least about 8. Generally, the upper limit of $I_{10}/I_2$ ratio for the homogeneously branched substantially linear ethylene polymers is about 50 or less, preferably about 30 or less, and especially about 20 or less.

Additives such as antioxidants (e.g., hindered phenolics (e.g., Irganox® 1010 made by Cibaeigy Corp.), phosphites (e.g., Irgafos® 168 made by CibaGeigy Corp.)), cling additives (e.g., polyisobutylene (PIB)), antiblock additives, pigments, and the like can also be included in the homogeneously branched substantially linear ethylene polymers used to make the elastic fibers, to the extent that they do not interfere with the enhanced fiber and fabric properties discovered by Applicants.

Molecular Weight Distribution Determination

The molecular weight distribution ($M_w/M_n$) of the interpolymers is analyzed by gel permeation chromatography (GPC) on a Waters 150C. high temperature chromatographic unit equipped with three mixed porosity columns (Polymer Laboratories 10$^3$, 10$^4$, 10$^5$, and 10$^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in *Journal of Polymer Science, Polymer Letters,* Vol. 6, (621) 1968, incorporated herein by reference) to derive the following equation:

$$M_{polyethylene}=a*(M_{polystyrene})^b.$$

In this equation, a=0.4316 and b=1.0. Weight average molecular weight, $M_w$, is calculated in the usual manner according to the following formula: $M_w = R\ w_i*M_i$, where $w_i$ and $M_i$ are the weight fraction and molecular weight, respectively, of the $i^{th}$ fraction eluting from the GPC column.

The $M_w/M_n$ of the substantially linear homogeneously branched ethylene polymers is defined by the equation:

$$M_w/M_n \leq (I_{10}/I_2)-4.63.$$

Preferably, the $M_w/M_n$ is from about 1.5 to about 25, and especially about 2.

The homogeneously branched substantially linear ethylene polymers can, however, have varying $I_{10}/I_2$ ratios due to long chain branch incorporation, while maintaining a low molecular weight distribution (i.e., $M_w/M_n$ from about 1.5 to about 2.5).

Processing Index Determination

The rheological processing index (PI) is measured by a gas extrusion rheometer (GER). The GER is described by M. Shida, R. N. Shroff and L. V. Cancio in Polym. Eng. Sci., Vol. 17, no. 11, p. 770 (1977), and in "Rheometers for Molten Plastics" by John Dealy, published by Van Nostrand Reinhold Co. (1982) on page 97–99, the disclosures of both of which are incorporated herein by reference. The processing index is measured at a temperature of 190° C., at nitrogen pressure of 2500 psig using 0.0296 inch diameter, 20:1 L/D die having an entrance angle of 180°. The GER processing index is calculated in millipoise units from the following equation:

$$PI=2.15\times10^6 \text{ dynes/cm}^2/(1000\times\text{shear rate}),$$

where: $2.15\times10^6$ dynes/cm² is the shear stress at 2500 psi, and the shear rate is the shear rate at the wall as represented by the following equation:

$$32 \ Q'/(60 \text{ sec/min})(0.745)(\text{Diameter}\times2.54 \text{ cm/in})^3,$$

where:

Q' is the extrusion rate (gms/min), 0.745 is the melt density of polyethylene (gm/cm³), and Diameter is the orifice diameter of the capillary (inches).

The PI is the apparent viscosity of a material measured at apparent shear stress of $2.15\times10^6$ dyne/cm².

For the homogeneously branched substantially linear ethylene polymers disclosed herein, the PI is less than or equal to 70 percent of that of a comparative homogeneously branched or heterogeneously branched linear ethylene polymer at about the same $I_2$ and $M_w/M_n$.

An apparent shear stress vs. apparent shear rate plot is used to identify the melt fracture phenomena. According to Ramamurthy in *Journal of Rheology* 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture is characterized at the beginning of losing extrudate gloss at which the surface roughness of extrudate can only be detected by 40× magnification. The critical shear rate at onset of surface melt fracture for the homogeneously branched substantially linear ethylene polymers is at least 50 percent greater than the critical shear rate at the onset of surface melt fracture of a homogeneously branched linear ethylene polymer having about the same $I_2$ and $M_w/M_n$.

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and onset of gross melt fracture (OGMF) will be used herein based on the changes of surface roughness and configurations of the extrudates extruded by a GER.

The Constrained Geometry Catalyst

Suitable constrained geometry catalysts for use in polymerizing the homogeneously branched substantially linear ethylene polymers used to make the elastic fibers preferably include constrained geometry catalysts as disclosed in U.S. application Serial Nos.: Ser. No. 545,403, filed Jul. 3, 1990; Ser. No. 758,654, filed Sep. 12, 1991 (now U.S. Pat. No. 5,132,380); Ser. No. 758,660, filed Sep. 12, 1991; and Ser. No. 720,041, filed Jun. 24, 1991, the teachings of all of which are incorporated herein by reference.

Polymerization

The improved melt elasticity and processability of the homogeneously branched substantially linear ethylene polymers used to make the fibers of the present invention result, it is believed, from their method of production. The polymers may be produced via a continuous (as opposed to a batch) controlled polymerization process using at least one reactor, but can also be produced using multiple reactors (e.g., using a multiple reactor configuration as described in U.S. Pat. No. 3,914,342 (Mitchell), incorporated herein by reference). The multiple reactors can be operated in series or in parallel, with at least one constrained geometry catalyst employed in at least one of the reactors at a polymerization temperature and pressure sufficient to produce the ethylene polymers having the desired properties. According to a preferred embodiment of the present process, the polymers are produced in a continuous process, as opposed to a batch process. Preferably, the polymerization temperature is from about 20° C. to about 250° C., using constrained geometry catalyst technology. If a narrow molecular weight distribution polymer ($M_w/M_n$ of from about 1.5 to about 2.5) having a higher $I_{10}/I_2$ ratio (e.g. $I_{10}/I_2$ of about 7 or more, preferably at least about 8, especially at least about 9) is desired, the ethylene concentration in the reactor is preferably not more than about 8 percent by weight of the reactor contents, especially not more than about 4 percent by weight of the reactor contents. Preferably, the polymerization is performed in a solution polymerization process. Generally, manipulation of $I_{10}/I_2$ while holding $M_w/M_n$ relatively low for producing the novel polymers described herein is a function of reactor temperature and/or ethylene concentration. Reduced ethylene concentration and higher temperature generally produces higher is $I_{10}/I_2$.

The polymerization conditions for manufacturing the homogeneously branched linear or substantially linear ethylene polymers used to make the elastic fibers of the present invention are generally those useful in the solution polymerization process, although the application of the present invention is not limited thereto. Slurry and gas phase polymerization processes are also believed to be useful, provided the proper catalysts and polymerization conditions are employed.

One technique for polymerizing the homogeneously branched linear ethylene polymers useful herein is disclosed in U.S. Pat. No. 3,645,992 (Elston), the disclosure of which is incorporated herein by reference.

In general, the continuous polymerization according to the present invention may be accomplished at conditions well known in the prior art for Ziegler-Natta or Kaminsky-Sinn type polymerization reactions, that is, temperatures from 0 to 250° C. and pressures from atmospheric to 1000 atmospheres (100 MPa).

Fibers and/or Fabric

The fibers claimed herein are elastic. The term "elastic" means that the fiber will recover at least about 50 percent of its stretched length after the first pull and after the fourth pull to 100% strain (doubled the length). Elasticity can also be described by the "permanent set" of the fiber. Permanent set is the converse of elasticity. A fiber is stretched to a certain point and subsequently released to the original position before stretch, and then stretched again. The point at which the fiber begins to pull a load is designated as the percent permanent set.

For the homogeneously branched substantially linear ethylene polymers used herein, the percent permanent set correlates with the density of the polymer selected for densities below about 0.91 g/cm$^3$. See FIGS. 1 and 2. Generally, the lower the density, the lower the permanent set. For fibers made from a homogeneously branched substantially linear ethylene polymer having a density less than about 0.90 g/cm$^3$, the percent permanent set is less than or equal to about 50% (i.e., the recovery is at least about 50%).

Various homnofil fibers can be made from the novel substantially linear ethylene polymers. Homofil fibers are those fibers which have a single region (domain) and do not have other distinct polymer regions (as do bicomponent fibers). These homofil fibers indude staple fibers, spunbond fibers or melt blown fibers (using, e.g., systems as disclosed in U.S. Pat. No. 4,340,563 (Appel et al.), U.S. Pat. No. 4,663,220 (Wisneski et al.), U.S. Pat. No. 4,668,566 (Braun), or U.S. Pat. No. 4,322,027 (Reba), all of which are incorporated herein by reference), and gel spun fibers (e.g., the system disclosed in U.S. Pat. No. 4,413,110 (Kavesh et al.), incorporated herein by reference)). Staple fibers can be melt spun (i.e., they can be extruded into the final fiber diameter directly without additional drawing), or they can be melt spun into a higher diameter and subsequently hot or cold drawn to the desired diameter using conventional fiber drawing techniques. The novel elastic staple fibers disclosed herein can also be used as bonding fibers, especially where the novel elastic fibers have a lower melting point than the surrounding matrix fibers. In a bonding fiber application, the bonding fiber is typically blended with other matrix fibers and the entire structure is subjected to heat, where the bonding fiber melts and bonds the surrounding matrix fiber. Typical matrix fibers which benefit from use of the novel elastic fibers includes, but is not limited to: poly(ethylene terephthalate) fibers; cotton fibers; nylon fibers; polypropylene fibers; other heterogeneously branched polyethylene fibers; and linear polyethylene homopolymer fibers. The diameter of the matrix fiber can vary depending upon the end use application.

Surprisingly, as illustrated in Example 39, a melt spun fiber made from a homogeneously branched substantially linear ethylene polymer has about the same percent recovery as a fiber melt spun at twice or three times the melt spun fiber diameter, and subsequently cold drawn to the same diameter. For example, a fiber made from a homogeneously branched substantially linear ethylene/1-octene copolymer ($I_2$ of about 29.99 g/10 minutes, density of about 0.87 g/cm$^3$, $I_{10}/I_2$ of about 7.2) having a diameter of about 5.6 denier/filament has a recovery of about 11% (at 100% strain after 4 pulls). The same polymer melt spun into a fiber having a diameter of about 16 denier/filament and drawn at a ratio of 2:1 to a diameter of about 8.1 denier/filament has a recovery of about 11% (at 100% strain after 4 pulls). Similarly, the same polymer melt spun into a fiber having a diameter of about 34 denier/filament and subsequently drawn at a 4:1 ratio to a diameter of about 8.6 denier/filament has a recovery of about 10% (at 100% strain after 4 pulls). This provides products that can maintain their elastic performance in spite of subsequent heat exposure, since elasticity is not a result of orientation that could be negated with heat treatment.

For the novel elastic fibers disclosed herein, the substantially linear polymer melt index can be widely varied, with surprisingly little impact upon the fibers' elasticity. This allows more design flexibility for fabrics and finished articles because the strength and retractive force of the fibers and fabrics can be changed independently of the elasticity. For example, the retractive force of a fiber can be changed by changing the polymer's melt index (decreasing the melt index increases the retractive force), rather than the fiber diameter, thus permitting a better optimization of fabric "hand" (i.e., feel) with the necessary elastic/strength fabric performance.

Bicomponent fibers can also be made from the novel homogeneously branched substantially linear ethylene polymers. Such bicomponent fibers have the homogeneously branched substantially linear ethylene polymer in at least one portion of the fiber. For example, in a sheath/core bicomponent fiber (i.e., one in which the sheath concentrically surrounds the core), the homogeneously branched substantially linear ethylene polymer can be in either the sheath or the core. Different homogeneously branched substantially linear ethylene polymers can also be used independently as the sheath and the core in the sante fiber, preferably where both components are elastic and especially where the sheath component has a lower melting point than the core component. Other types of bicomponent fibers are within the scope of the invention as well, and include such structures as side-by-side fibers (e.g., fibers having separate regions of polymers, wherein the homogeneously branched substantially linear ethylene polymer comprises at least a portion of the fiber's surface).

The shape of the fiber is not limited. For example, typical fiber have a circular cross sectional shape, but sometimes fibers have different shapes, such as a trilobal shape, or a flat (i.e., "ribbon" like) shape. The elastic fiber disclosed herein is not limited by the shape of the fiber.

Fiber diameter can be measured and reported in a variety of fashions. Generally, fiber diameter is measured in denier per filament. Denier is a textile term which is defined as the grams of the fiber per 9000 meters of that fiber's length. Monofilament generally refers to an extruded strand having a denier per filament greater than 15, usually greater than 30. Fine denier fiber generally refers to fiber having a denier of about 15 or less. Microdenier (aka microfiber) generally refers to fiber having a diameter not greater than about 100 micrometers. For the novel elastic fibers disclosed herein, the diameter can be w$_i$dely varied, with little impact upon the fiber's elasticity. However, the fiber denier can be adjusted to suit the capabilities of the finished article and as such, would preferably be: from about 0.5 to about 30 denier/filament for melt blown; from about 1 to about 30 denier/filament for spunbond; and from about 1 to about 20,000 denier/filament for continuous wound filament.

Fabrics made from such novel fibers include both woven and nonwoven fabrics. Nonwoven fabrics can be made variously, including spunlaced (or hydrodynamically entangled) fabrics as disclosed in U.S. Pat. No. 3,485,706 (Evans) and U.S. Pat. No. 4,939,016 (Radwanski et al.), the disclosures of which are incorporated herein by reference; by carding and thermally bonding staple fibers; by spunbonding continuous fibers in one continuous operation; or by melt blowing fibers into fabric and subsequently calandering or thermally bonding the resultant web. These various nonwoven fabric manufacturing techniques are well known to those skilled in the art and the disclosure is not limited to any particular method. Other structures made from such fibers are also included within the scope of the invention, including e.g., blends of these novel fibers with other fibers (e.g., poly(ethylene terephthalate) (PET) or cotton).

As used in the claims herein, the term "consisting essentially of" means that both the homogeneously branched linear or substantially linear ethylene polymers used to make the fibers and fabrics cars have additional materials which do not materially affect the elasticity of the fibers or fabric. Such useful nonliriting additive materials include pigments, antioxidants, stabilizers, surfactants (e.g., as disclosed in U.S. Pat. No. 4,486,552 (Niemann), U.S. Pat. No. 4,578,414 (Sawyer et al.) or U.S. Pat. No. 4,835,194 (Bright et al.), the disclosures of all of which are incorporated herein by reference).

Fabricated Articles

Fabricated articles which can be made using the novel elastic fibers and fabrics disclosed herein include composite fabric articles (e.g., diapers) that desire elastic portions. For example, elastic portions are desired in diaper waist band portions to prevent the diaper from falling and leg band portions to prevent leakage (as shown in U.S. Pat. No. 4,381,781 (Sciaraffa), the disclosure of which is incorporated herein by reference). Often, the elastic portions promote better form fitting and/or fastening systems for a good combination of comfort and reliability. The novel elastic fibers and fabrics disclosed herein can also produce structures which combine elasticity with breathability.

The novel elastic fibers and fabrics disclosed herein can also be used in various structures as described in U.S. Pat. No. 2,957,512 (Wade), the disclosure of which is incorporated herein by reference. For example, layer 50 of the structure described in U.S. Pat. No. '512 (i.e., the elastic component) can be replaced with the novel elastic fibers and fabrics, especially where flat, pleated, creped, etc., non-elastic materials are made into elastic structures. Attachment of the novel elastic fibers and/or fabric to non-elastic fibers, fabrics or other structures can be done with melt bonding or with adhesives. Gathered or shirred elastic structures can be produced from the new elastic fibers and/or fabrics and non-elastic components by pleating the non-elastic component (as described in U.S. Pat. No. '512) prior to attachment, prestretching the elastic component prior to attachment, or heat shrinking the elastic component after attachment.

The novel elastic fibers described herein also can be used in a spunlaced (or hydrodynamically entangled) process to make novel structures. For example, U.S. Pat. No. 4,801,482 (Goggans), the disclosure of which is incorporated herein by reference, discloses an elastic sheet (12) which can now be made with the novel elastic fibers/fabric described herein.

Continuous elastic filaments as described herein could also be used in woven applications where high resilience is desired.

The novel elastic fibers and fabrics disclosed herein also have adjustable tenacity and retractive force, which enables design flexibility for variable retractive force in the same garment, if needed, as described for example in U.S. Pat. No. 5,196,000 (Clear et al.), the disclosure of which is incorporated herein by reference.

U.S. Pat. No. 5,037,416 (Allen et al.), the disclosure of which is incorporated herein by reference, describes the advantages of a form fitting top sheet by using elastic ribbons (see member 19 of U.S. patent '416). The novel elastic fibers could serve the function of member 19 of U.S. patent '416, or could be used in fabric form to provide the desired elasticity.

Composites that utilize very high molecular weight linear polyethylene or copolymer polyethylene also benefit from the novel elastic fibers disclosed herein. For example, the novel elastic fibers have a low melting point (with the melting point of the polymer essentially linearly related to the polymer density), such that in a blend of novel elastic fibers and very high molecular weight polyethylene fibers (e.g., Spectra™ fibers made by Allied Chemical) as described in U.S. Pat. No. 4,584,347 (Harpell et al.), the disclosure of which is incorporated herein by reference, the lower melting elastic fibers bond the high molecular weight polyethylene fibers without melting the high molecular weight fibers, thus preserving the high strength and integrity of the high molecular weight fiber.

In U.S. Pat. No. 4,981,747 (Morman), the novel elastic fibers and/or fabrics disclosed herein can be substituted for elastic sheet 122, which forms a composite elastic material including a reversibly necked material.

The new elastic fibers can also be a melt blown elastic component, as described in reference 6 of the drawings of U.S. Pat. No. 4,879,170 (Radwanski), the disclosure of which is incorporated herein by reference. U.S. patent '170 generally describes elastic coform material and manufacturing processes.

Elastic panels can also be made from the novel elastic fibers and fabrics disclosed herein, and can be used, for example, as members 18, 20, 14, and/or 26 of U.S. Pat. No. 4,940,464 (Van Gompel), the disclosure of which is incorporated herein by reference. The novel elastic fibers and fabrics described herein can also be used as elastic components of composite side panels (e.g., layer 86 of U.S. patent '464).

Experimental

Fibers are produced by extruding the polymer using a one inch diameter extruder which feeds a gear pump. The gear pump pushes the material through a spin pack containing a 40 micrometer (average pore size) sintered flat metal filter and a 34 hole spinneret. The spinneret holes have a diameter of 400 micrometers and a land length (i.e., length/diameter or L/D) of 4/1. The gear pump is operated such that about 0.39 grams of polymer are extruded through each hole of the spinneret per minute. Melt temperature of the polymer is typically about 204° C., but varies depending upon the molecular weight of the polymer being spun. Generally the higher the molecular weight, the higher the melt temperature. Quench air (slightly above room temperature (about 25C) is used to help the melt spun fibers cool. The quench air is located just below the spinneret and blows air across the fiber line as it is extruded. The quench air flow rate is low enough so that it can barely be felt by hand in the fiber area below the spinneret. The fibers are collected on a godet roll having a diameter of about 6 inches (15.24 cm). The godet roll speed is adjustable, but for the experiments demonstrated herein, the godet speed is about 1500 revolutions/minute. The godet roll is located about 3 meters below the spinneret die.

Fibers are tested on an Instron tensile testing device equipped with a small plastic jaw on the cross-head (the jaw has a weight of about six gms) and a 500 gram load cell. The jaws are set 1 inch (2.54 cm) apart. The cross head speed is set at 5 inches/minute (12.7 cm/minute). A single fiber is loaded into the Instron jaws for testing. The fiber is then stretched to 100% of strain (i.e., it is stretched another 1 inch), where the tenacity is recorded. The fiber is allowed to return to the original Instron setting (where the jaws are again 1 inch apart) and the fiber is again pulled. At the point where the fiber begins to provide stress resistance, the strain is recorded and the percent permanent set is calculated. In one example, a fiber pulled for the second time did not provide stress resistance (i.e., pull a load) until it had traveled 0.1 inches (0.25 cm). Thus, the percent permanent set is calculated as 10%, i.e., the percent of strain at which the fiber begins to provide stress resistance. The numerical difference between the percent permanent set and 100% is known as the percent elastic recovery. Thus, a fiber having a permanent set of 10% will have a 90% elastic recovery. After recording percent permanent set, the fiber is pulled to 100% strain and the tenacity recorded. The fiber pulling process is repeated several times, with the percent permanent set recorded each time and the 100% strain tenacity recorded as well. Finally, the fiber is pulled to its breaking point and the ultimate breaking tenacity and elongation are recorded.

Examples 1–19 and Comparative Examples 20–36

Examples 1–19 are made from elastic substantially linear ethylene/1-octene copolymers produced using a continuous solution polymerization process and a constrained geometry catalyst system as described in pending U.S. application Ser. No. 07/776,130 and in pending U.S. application Ser. No. 07/939,281, (now U.S. Pat. No. 5,278,272).

Table 1 summarizes percent permanent set data for melt spun (i.e., no further mechanical drawing) fiber for Examples 1–19. The percent permanent set is obtained by pulling each fiber to 100% strain five times, at which point the percent permanent set is recorded as described earlier in this disclosure.

TABLE 1

| Ex. | $I_2$ (g/10 min) | Density (g/cm$^3$) | $I_{10}/I_2$ | Denier (avg.) | $M_w/M_n$ | Perm. Set* (%) | Perm. Set** (%) |
|---|---|---|---|---|---|---|---|
| 1 | 27.45 | 0.8975 | 6.3 | 4.1 | 2.23 | 39 | 47 |
| 2 | 27.12 | 0.8856 | 7.9 | 5 | 2.05 | 26 | 37 |
| 3 | 18.8 | 0.8853 | 7.5 | 5.8 | 2.06 | 23 | 31 |
| 4 | 17.18 | 0.8739 | 6.9 | 5.6 | 1.93 | 9 | 13 |
| 5 | 5.17 | 0.8732 | 10.4 | 5.5 | 1.9 | 12 | 17 |
| 6 | 5.46 | 0.873 | 7.5 | 6.7 | 2.08 | 7 | 12 |
| 7 | 87.72 | 0.8729 | 7.3 | 5.3 | 1.99 | 11 | 19 |
| 8 | 31.5 | 0.8727 | 7.3 | 5 | 2.13 | 16 | 23 |
| 9 | 10.87 | 0.8724 | 7.1 | 4.3 | 1.87 | 8 | 13 |
| 10 | 6.61 | 0.8719 | 7 | 5.3 | 1.92 | 8 | 12 |
| 11 | 27.64 | 0.8714 | 9.4 | 4.9 | 2.08 | 10 | 15 |
| 12 | 18.52 | 0.8713 | 7.9 | 5.3 | 2.18 | 11 | 16 |
| 13 | 9.96 | 0.871 | 7.7 | 4.9 | 2.12 | 8 | 12 |
| 14 | 0.81 | 0.8702 | 8.1 | 10,400 | 2.05 | 6 | 10 |
| 15 | 29.99 | 0.87 | 7.2 | 5.6 | 2.09 | 8 | 11 |
| 16 | 30 | 0.86 | 7.3 | 4.5 | 2.07 | 6 | 9 |
| 17 | 30 | 0.86 | 6.5 | 5.1 | 1.93 | 3 | 7 |
| 18 | 40.25 | 0.8548 | 7 | 4.9 | 1.88 | 6 | 9 |
| 19 | 35 | 0.85 | NM | 5 | 1.98 | 5 | 10 |

*After the 1st pull
**After the 4th pull
NM = Not Measured

Examples 1–19 are all easily made into fiber and have less permanent set (more resiliency) than comparative examples 20–32. The lower density examples (less than 0.88 g/cc$^3$) have elastic properties rivaling that of comparative examples 33–36, which are currently used, either alone or in combination with traditional non-elastic polymers (e.g., polypropylene or heterogeneously branched linear ethylene polymers).

Homogeneously branched substantially linear ethylene/1-octene copolymers having densities above 0.90 g/cm$^3$ are also melt spun into fiber and tested for elastic properties in comparative examples 20–27.

Comparative Examples 28–32 are fibers melt spun from conventional heterogeneously branched ethylene/1-octene polymers (such as DOWLEX® polyethylene and ASPUN® Fiber Grade Resins, both made by The Dow Chemical Company).

Comparative Example 33 is a set of rubber fibers/strips made by JPS Corp. Comparative example 34 is Lycra™ fiber (made by DuPont).

Comparative examples 35, 36 and 37 are elastic components from Huggies™ Pull Ups diapers (made by Kimberly Clark Corp.). After the polypropylene fabric is stripped off of the elastic side panel, a set of thin strips are cut from the elastic side panels of the diapers and tested as comparative example 35 to simulate performance of individual fibers.

The elastic fibers from the waist band of the diapers are identified as polyurethane (by infrared) and are tested as comparative example 36.

Fabric cut from the stripped elastic side panel is designated comparative example 37 and has a basis weight of about 0.64–0.69 grams/square inch. Comparative example 37 is tested in accordance with the method used for testing the fibers (but by using a one inch by one inch square piece of fabric) and has a percent permanent set of about 2% after the first pull and a percent permanent set of about 3% after the fourth pull.

Figure 2:
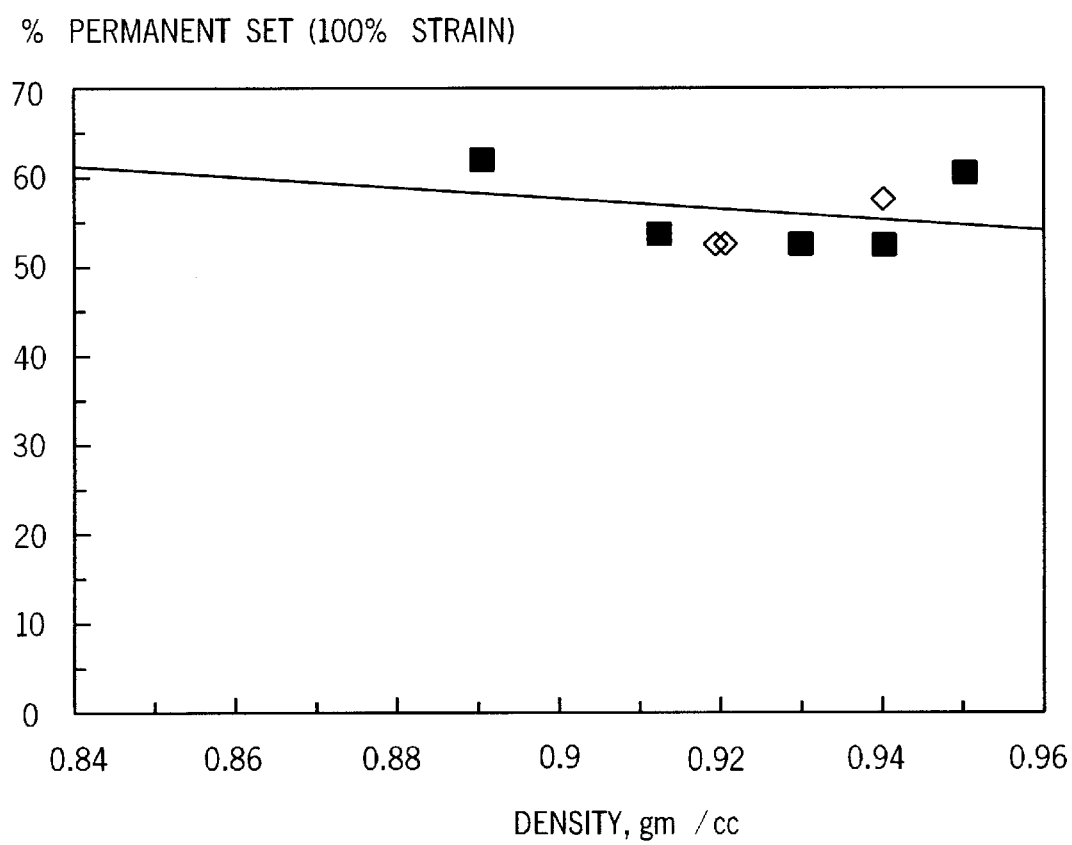
FIG. 2 graphically displays percent permanent set for fiber made from substantially linear ethylene polymers having a density greater than 0.91 and for fibers made from heterogeneously branched linear polyethylenes.

FIG. 1 displays a plot of the polymer density versus the percent permanent set of the fiber after the first pull made from that polymer for examples 1–19 and comparative examples 23–27. Table 2 summarizes data obtained for fiber of comparative examples 20–22 and comparative examples 28–32:

TABLE 2

| Comp. Ex. | $I_2$ (g/10 min) | Density (g/cm$^3$) | $I_{10}/I_2$ | Denier (avg.) | $M_w/M_n$ | Perm. Set* (%) | Perm. Set** (%) |
|---|---|---|---|---|---|---|---|
| 20 | 31.6 | 0.94 | 6 | 5.2 | 1.85 | 58 | 68 |
| 21 | 17.37 | 0.9208 | 6.6 | 4.8 | 2 | 53 | 60 |
| 22 | 26.67 | 0.9195 | 6.5 | 5.3 | 1.97 | 53 | 56 |
| 23 | 5.7 | 0.9096 | 8.1 | 4 | 2.24 | 66 | 71 |
| 24 | 17.09 | 0.9027 | 6.9 | 4 | 2.11 | 50 | 53 |
| 25 | 10.26 | 0.9025 | 7.1 | 4.4 | 2.11 | 57 | 60 |
| 26 | 28.13 | 0.9019 | 7 | 6 | 2.13 | 41 | 52 |
| 27 | 4.51 | 0.9015 | 7.4 | 5.3 | 2.15 | 57 | 64 |
| 28 | 17 | 0.95 | 6.5 | 4.8 | 2.63 | 61 | 70 |
| 29 | 34 | 0.9406 | 6.6 | 4.5 | 2.71 | 53 | 61 |
| 30 | 18 | 0.93 | 7 | 5.3 | 2.73 | 53 | 62 |
| 31 | 6 | 0.9124 | 7.6 | 4.2 | 3.47 | 54 | 64 |
| 32 | 3.8 | 0.8904 | 8.8 | 4.8 | 3.7 | 62 | 70 |
| 33 | NA | NA | NA | 2100 | NA | 5 | 8 |
| 34 | NA | NA | NA | 1900 | NA | 5 | 5 |
| 35 | NA | NA | NA | NM | NA | 2 | 4 |
| 36 | NA | NA | NA | 1000 | NA | 4 | 9 |

*After the 1st pull
**After the 4th pull
NA = Not Applicable
NM = Not Measured

Example 38

The polymer used in example 15 is melt blown into fabric having a basis weight of about 0.51 grams/square inch. The fibers have a diameter of about 20 microns. The fabric is tested in accordance with the method described for the fiber examples, but by using a piece of fabric one inch by one inch square. The fabric has a percent permanent set of 6% after the first pull, and a percent permanent set of 10% after the fourth pull, demonstrating that the novel fibers of the invention can be made into nonwoven fabric which also has beneficial elastic properties.

Example 39

The polymer used in example 15 is melt spun to a diameter of about 16 denier/filament and then mechanically drawn between successive godet rolls at a draw ratio of 2:1 to a diameter of about 8.1 denier/filament. The resultant fiber has a permanent set of about 11% at 100 strain (measured after the fourth pull). Comparing this result with that of example 15, the data shows that drawing the fiber has little effect, if any, on the resultant elasticity of the fiber.

The polymer used in example 15 is melt spun to a diameter of about 34 denier/filament and then mechanically drawn between successive godet rolls at a draw ratio of 4:1 to a diameter of about 8.6 denier/filament. The resultant fiber has a permanent set of about 10% at 100 strain (measured after the fourth pull). Comparing this result with that of example 15, the data shows that drawing the fiber has little effect, if any, on the resultant elasticity of the fiber, as did a similar experiment using a draw ratio of 2:1.

Example 40

The polymer used in example 15 is made into fiber having a diameter of about 5.3 denier/filament using an air gun (model Lufan 200/490 made by Enka Tecnica) to simulate a spun bond process. The air gun pressure is about 50 psi. No fiber breakage or air gun sticking is observed during spinning.

Example 41

Example 41 summarizes spinning performance data from examples 2, 3, 8 and 24 and examples A and B. Table 3 lists the pump pressure for each of these polymers as a function of the polymer's melt index (12), melt flow ratio ($I_{10}/I_2$) and density:

TABLE 3

| Example | $I_2$ (g/10 min) | $I_{10}/I_2$ | $M_w/M_n$ | Density (g/cm$^3$) | Pump pressure (psi) |
|---|---|---|---|---|---|
| 23 | 17.1 | 7.1 | 2.11 | 0.9027 | 500 |
| 2 | 18.8 | 7.5 | 2.06 | 0.885 | 410 |
| A | 18 | 5.3 | 1.8 | 0.895 | 600 |
| 1 | 27.1 | 7.9 | 2.05 | 0.886 | 380 |
| 7 | 31.5 | 7.3 | 2.13 | 0.873 | 350 |
| B | 35 | 5.6 | 2.05 | 0.882 | 400 |

Example A is made from a homogeneously branched ethylene/butene copolymer trademarked TAFMER™ A20090, which is made by Mitsui Petrochemical.

Example B is made from a homogeneously branched ethylene/butene copolymer trademarked EXACT™ 4023, which is made by Exxon Chemical Corporation.

The data show that as the amount of long chain branching increases in the substantially linear ethylene polymer (indicated by increasing $I_{10}/I_2$ ratio), the pump pressure required to convey the polymer through the spin pack decreases, even though the molecular weight distribution ($M_w/M_n$) remains about the same. For all of these examples, the polymer is pumped at a rate of about 0.39 grams/minute/hole.

Melt spinning polyethylene has been found to be enhanced by using high shear media (or sintered metal filters) as disclosed in U.S. Ser. No. 07/750,662, filed Aug. 27, 1991, now U.S. Pat. No. 5,254,299, the disclosure which is incorporated herein by reference. However, use of high shear media may not always be practical since the spin pack design must withstand high pressures and the seals often cannot tolerate such pressures. Thus, use of substantially linear ethylene polymers in a spinning system comprising sintered metal filters (or similar high shear media) enables fibers to be made under lower pressure conditions.

We claim:

1. A fiber having an exterior surface, the fiber comprising at least two elastic polymers in which at least one of the elastic polymers forms at least a portion of the exterior surface, wherein at least one of the elastic polymers is a homogeneously branched substantially linear ethylene polymer.

2. A fiber comprising at least two elastic polymers in which at least one of the polymers is a homogeneously branched substantially linear ethylene polymer.

3. A bicomponent elastic fiber having a sheath/core construction in which at least one of the sheath and core comprises a homogeneously branched substantially linear ethylene polymer.

4. A bicomponent elastic fiber having a sheath/core construction in which both of the sheath and core comprises a homogeneously branched substantially linear ethylene polymer, the polymer of the sheath different than the polymer of the core.

5. A bicomponent elastic fiber having a side-by-side construction in which at least one region of the fiber comprises a homogeneously branched substantially linear ethylene polymer.

6. A bicomponent elastic fiber having a side-by-side construction in which both sides of the fiber comprise a homogeneously branched substantially linear ethylene polymer, the polymer of one region of the fiber different than the polymer of the other region of the fiber.

7. An elastic fabric comprising the elastic fiber of any of claims 1 and 2–6.

8. A fabricated article comprising the elastic fiber of any of claims 1 and 2–6.

* * * * *